United States Patent
Carrillo

(12) 
(10) Patent No.: US 6,270,063 B1
(45) Date of Patent: Aug. 7, 2001

(54) OZONE DIFFUSER FOR DEIONIZED WATER

(75) Inventor: Francisco (Paco) Carrillo, Stafford, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/354,983

(22) Filed: Jul. 16, 1999

Related U.S. Application Data

(60) Provisional application No. 60/094,218, filed on Jul. 27, 1998.

(51) Int. Cl.$^7$ .................................................. B01F 3/04
(52) U.S. Cl. ........................................ 261/122.1; 261/123
(58) Field of Search ............................. 261/121.1, 123, 261/122.1

(56) References Cited

U.S. PATENT DOCUMENTS

| | | | |
|---|---|---|---|
| 3,216,951 | * 11/1965 | Erickson et al. | 261/123 |
| 3,506,484 | * 4/1970 | Domsa | 261/123 |
| 4,673,443 | * 6/1987 | Fetty | 261/123 |
| 5,091,315 | * 2/1992 | McCarty et al. | 261/123 |
| 5,160,714 | * 11/1992 | Hardison | 261/123 |
| 5,262,051 | * 11/1993 | Iwatsuka | 261/123 |
| 5,645,797 | * 7/1997 | Lo | 261/123 |
| 5,651,939 | * 7/1997 | Murrer et al. | 261/123 |
| 5,766,519 | * 6/1998 | Erickson | 261/123 |

* cited by examiner

Primary Examiner—C. Scott Bushey
(74) Attorney, Agent, or Firm—Wade James Brady, III; Frederick J. Telecky, Jr.

(57) ABSTRACT

An embodiment of the instant invention is an apparatus for diffusing a first substance into a second substance. The apparatus includes a first region where the first substance and the second substance flow in substantially the same direction; and a second region where the first substance and the second substance flow in substantially opposite directions. Preferably, the apparatus is arranged as an outer structure which encompasses the first region and the second region, and which is formed of PP, PTFE, PFA, ECTFE, PVDF, PE, PMMA, ABS, PC, PSO, PES, PEI, PBT, PPS, PEEK, PETG, Keelf, quartz, or any combination thereof. The first substance is, preferably, a substance selected from the group consisting of: ozone, ammonia, HCl, or any combination thereof, and the second substance is a substance selected from the group consisting of: DIW, ammonia, HCl, HF, peroxide, sulfuric acid, or any combination thereof.

13 Claims, 3 Drawing Sheets

OZONE DIFFUSER FOR DEIONIZED WATER

This application claims priority under 35 USC §119(e)(1) of provisional application No. 60/094,218 filed Jul. 27, 1998, now abandoned.

FIELD OF THE INVENTION

The instant invention pertains to semiconductor device fabrication and processing and more specifically to an apparatus for diffusing ozone in deionized-ultrapure water.

BACKGROUND OF THE INVENTION

Deionized water ("DIW" or "DI water") is widely used throughout the semiconductor device fabrication industry. Recently, the benefits of mixing ozone in DIW were discovered. For example, a mixture of DIW and ozone was recently used to remove photoresist from bare silicon. In a broader study, the mixture of ozonated DIW was found to effectively remove most organic impurities and all kinds of particulates which are common in semiconductor device processing from a silicon wafer. In addition, the ozone/DIW mixture has been found to effectively rinse processed wafers after an etching and stripping step. Furthermore, it has been found to effectively remove metal contaminants from silicon surfaces.

However, present techniques for ozonating DIW results in low concentrations of ozone in the DIW. One such method, which is widely used, is to bubble ozone into the DIW in a DIW bath. Using this method, the ozone bubbles around the wafer as it is immersed in the DIW. Not only does this method yield very low concentration of ozone diffused in the DIW (see curve 302 of FIG. 3), it also may result in the contamination of the wafer by small particles carried by the bubbles resulting in low ozone concentration, low particle removal efficiency, and longer process time.

Another method involves a device created by Gore Technologies. The device is configured so that a tube comprised of a porous membrane is passed within a closed container. Ozone is introduced into the container, and DIW is flowed through the container within the membrane. Optimally, the ozone passes through the membrane and ozonates the DIW. However, the ozone must remain at a fairly constant higher pressure than the DIW. In addition, the pressure of the DIW must be low and must not change too much, and the temperature of the membrane must be held at a fairly constant value which is not to high. Otherwise, the DIW will leak through the membrane and into the container. Furthermore, this method and device only marginally ozonates the DIW. Specifically, the ozone concentration is around 10 ppm using this device for its intended use in a single pass.

One other method utilizes a device fabricated by Sorbios. This device is comprised of a tube through which both DIW and ozone flow. A quartz agitator within the tube agitates the DIW and the ozone so as to ozonate the DIW. Due to its agitating nature, bubbles are generated with this device and bubbles are known to carry particles. Hence, this device may cause the contamination of a wafer, which utilizes ozonated DIW using this device. In addition, this device only marginally ozonates DIW. Specifically, the ozone concentration is around 4 ppm using this device and because the device is made of quartz, it is extremely fragile.

SUMMARY OF THE INVENTION

The diffuser as the instant invention enhances the ability of mixing the gas (preferably ozone) into a liquid stream (preferably DIW) in higher concentrations, and minimizing the time of reaching the higher concentration possible. The concentration of gas (preferably ozone) into the liquid (preferably DIW) is determined by the relative temperature of the liquid and the gas. In the particular case of ozone and DIW, the lower the temperature of the DIW, the higher the capability of concentration of ozone.

Another aspect of the instant invention involves the ability of mixing the gas (preferably ozone) and the liquid (preferably DIW) at different pressures [from 1 to 50 psi of the gas (preferably ozone) and 0.01 liters per minute to 40 liters per minute with the pressure of the gas (preferably ozone) in higher pressure than the liquid (preferably DIW)]. Another attribute of the diffuser involves the ability to separate the gas (preferably ozone) from the liquid (preferably DIW) and dispense the mixture of the liquid (preferably DIW) and the gas (preferably ozone) dissolved into the liquid without having air pockets or bubbles.

An embodiment of the instant invention is an apparatus for diffusing a first substance into a second substance, the apparatus comprising: first region where the first substance and the second substance flow in substantially the same direction; and a second region where the first substance and the second substance flow in substantially opposite directions. Preferably, the apparatus further comprises an outer structure which encompasses the first region and the second region and which is comprised of: PP, PTFE, PFA, ECTFE, PVDF, PE, PMMA, ABS, PC, PSO, PES, PEL, PBT, PPS, PEEK, PETG, Keelf, quartz, or any combination thereof. The first substance is, preferably, comprised of a substance selected from the group consisting of: ozone, ammonia, HCl, or any combination thereof, and the second substance is comprised of a substance selected from the group consisting of: DIW, ammonia, HCl, HF, peroxide, sulfuric acid, or any combination thereof.

Another embodiment of the instant invention is an apparatus for diffusing a first substance into a second substance, the apparatus comprising: a top outer wall; a bottom outer wall; a front outer wall; a back outer wall; a first side outer wall; a second side outer wall, the outer walls defining an inner space therein; a first inner wall extending from an inner surface of the bottom outer wall almost to an inner surface of the top outer wall within the inner space, a first space is present between the first inner wall and the inner surface of the top outer wall; a second inner wall extending from the inner surface of the top outer wall almost to the inner surface of the bottom wall within he inner space, a second space is present between the second inner wall and the inner surface of the bottom wall; a passage extending from first side wall substantially to the second side wall in the inner space, the first substance introduced into the passage so as to introduce the first substance into the second substance in the inner space; a first chamber formed within the inner surface and defined by the first inner wall and the first side outer wall; a second chamber formed within the inner surface and defined by the second inner wall and the second outer wall; and wherein in either the first chamber or the second chamber the first substance and the second substance flow in same direction and the first substance and the second substance flow in the opposite direction in the other of the first or second chambers. Preferably, the first inner wall, the second inner wall, the top outer wall, the bottom outer wall, the front outer wall, the back outer wall, the first side outer wall, and the second side outer wall are comprised of the same material, which is preferably comprised of: PP, PTFE, PFA, ECTFE, PVDF, PE, PMMA, ABS, PC, PSO, PES, PEI, PBT, PPS, PEEK, PETG, Keelf, quartz, and any combination thereof. The first substance is, preferably, comprised of a substance selected from the group consisting of: ozone, ammonia, HCl, or any combination thereof, and the second substance is, preferably, comprised of a substance selected from the group consisting of: DIW, ammonia, HCl, HF, peroxide, sulfuric acid, and any combination thereof.

DETAILED DESCRIPTION OF THE DRAWINGS

Figure 1A:
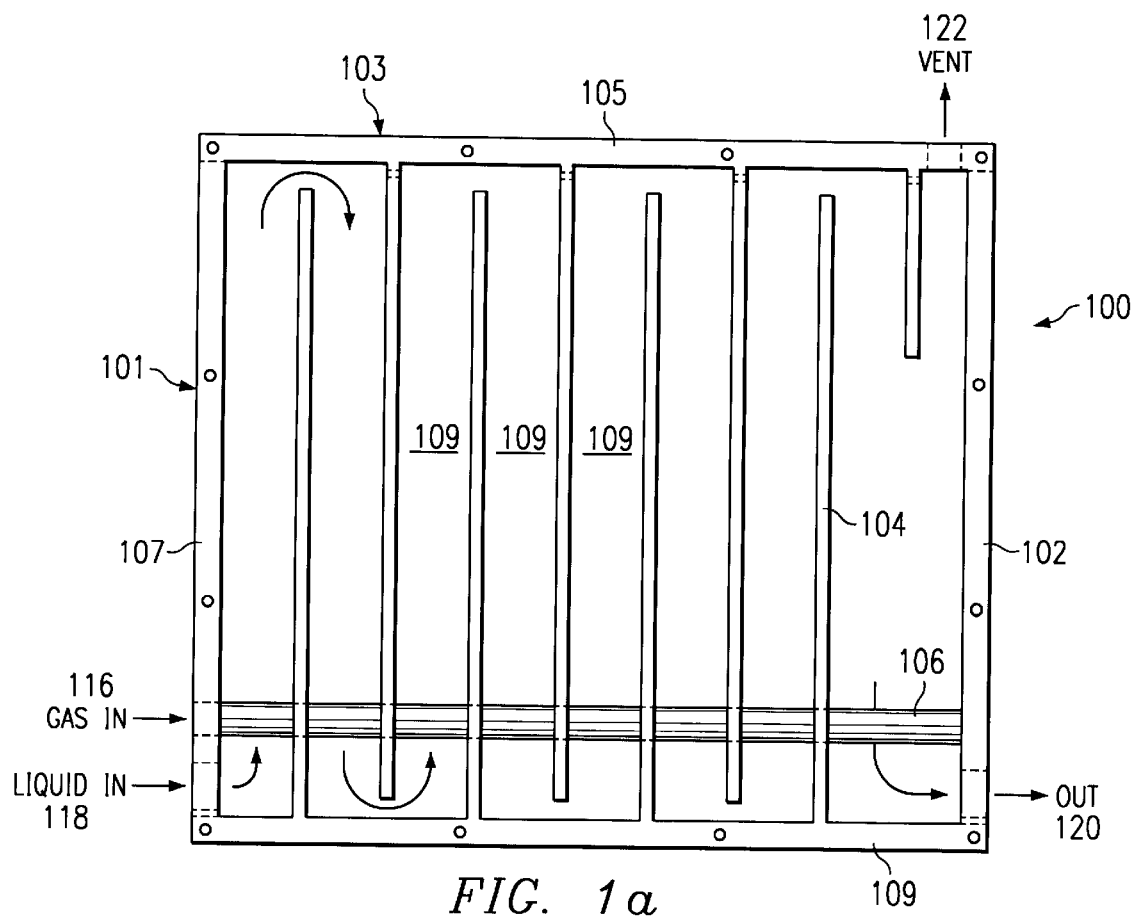
FIGS. 1a–c include a cross-sectional front view, a cross-sectional top view and a side view of the device of one embodiment of the present invention.
Figure 1B:
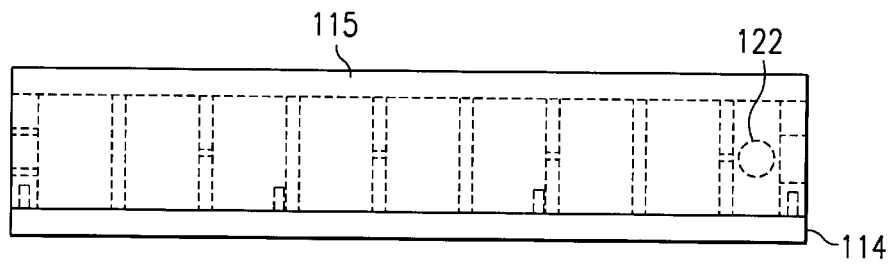
Figure 1C:
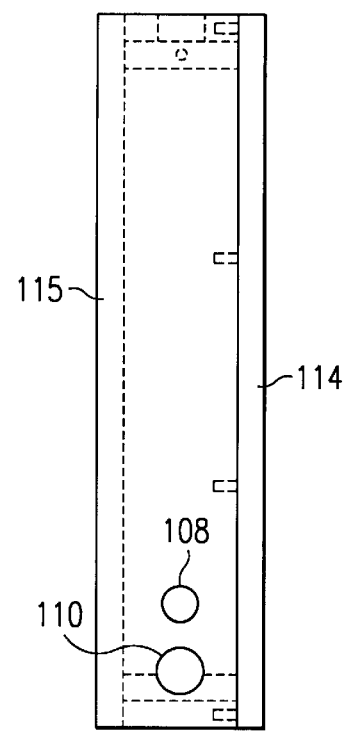

FIGS. 1a–1c illustrate one embodiment of the instant invention. Basically, this embodiment of the instant invention is a device for diffusing a gas (preferably ozone) into a liquid (preferably DIW). While the following description will be centered around a system in which the gas is ozone and the liquid is DIW, many other gases and liquids can be used. The gas may be comprised of ozone, ammonia, HCl, any semiconductor grade gas which is soluble in DIW, or ultra pure gas, and the liquid may be comprised of DIW, ammonia, hydrochloric acid, hydrofluoric acid, peroxide, sulfuric acid, or liquid with viscosity lower than 3 cp. The instant device can diffuse any of the aforementioned gases into any of the aforementioned liquids in a temperature range between 4.5 and 140 degrees Celsius (preferably around 4.5 to 70 degrees Celsius). In addition, while the instant device is illustrated in FIG. 1 as being a box-shaped device with a rectangular cross section, the device of the instant invention can have any shape and can be made to virtually any dimensions. The longer the device is (and the more passages 109 that the device has) translates into greater diffusion of the gas into the liquid (to a point at which the liquid is "saturated" with the gas).

Figure 2:
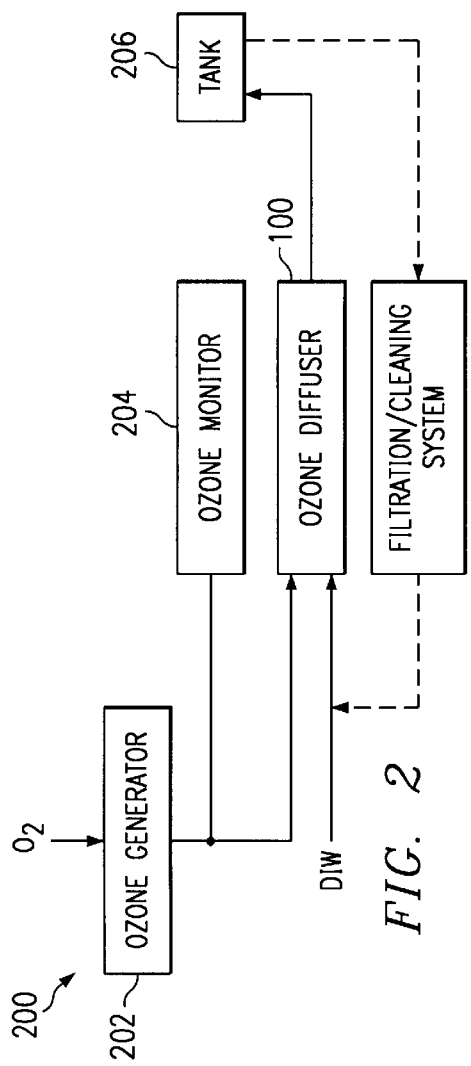
FIG. 2 is a block diagram of a processing system which utilizes the device of the instant invention.
Figure 3:
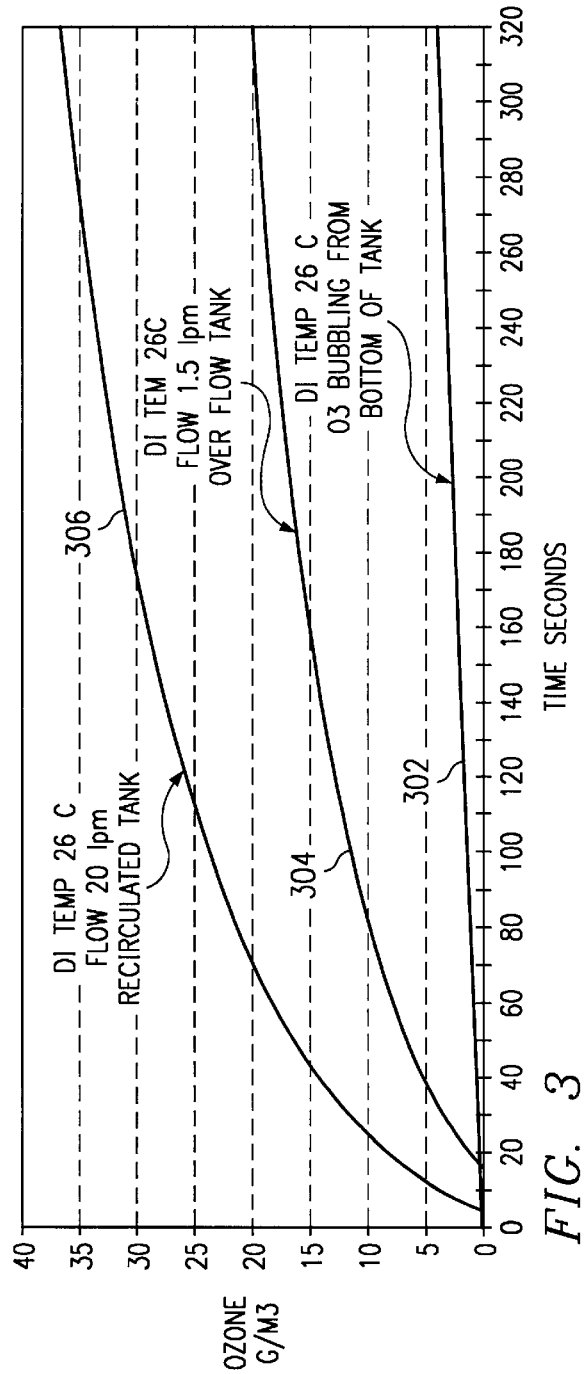
FIG. 3 is a graph illustrating the concentration of ozone dissolved in deionized water versus time (sec.) using a standard processing bath (one pass), the device of the instant invention, and the device of the instant invention in which the ozonated DIW is recirculated back through the device of the instant invention with a pump or impeller device.

Referring to FIG. 2, ozone diffuser 100 of the instant invention may be used to supply ozonated DIW to processing tank 206. As described above, his may be used in many different ways to do many different processing tasks. Preferably, the ozonated DIW would be supplied to tank 206 in which partially fabricated wafers would be immersed. The ozonated DIW may be recirculated through ozone diffuser 100 or it may be discarded. As is shown in FIG. 3 (plot 306), the recirculated ozonated DIW may have a higher concentration of ozone than DIW (up to a saturation point determined by the temperature), which is run through diffuser 100 only once.

The DIW input to diffuser 100 may come from a dean supply of DIW or it may be cleaned, filtered and recirculated back to tank 206 by a pump or the like (shown as a dotted line in FIG. 2). The ozone input into diffuser 100 originates from oxygen (preferably $O_2$) passing through ozone generator 202 which converts the $O_2$ into ozone. An ozone monitor 204 may be connected to the input of diffuser 100 so as to verify that ozone is, in fact, being provided to diffuser 100 as well as an in-line liquid ozone monitor at the output of the diffuser 100, to quantify the amount of ozone dissolved in the liquid (preferably DIW).

Referring to FIGS. 1a–1d, outer walls 102, 105, 107 and 109, inner walls 104, back cover 115, and front cover 114 are preferably comprised of a material which neither contaminates the DIW, rusts, nor has pores large enough to hold contaminants. More specifically, these walls are preferably comprised of quartz or a semiconductor grade polymer, such as: PP (Polypropylene [any color or no color]); PTFE (Polytetra fluoroethylene); PFA (Ethylene tetrefluoroethylene); ECTFE (Ethylene chlorotrifluoroethylene); PVDF (Polyvinylidene fluoride); PE (Polyethylene); PMMA (Polymethyl methacrylate); ABS (Acrylonitride Butadiene styrene); PC (Polycarbonate); PSO (Polysulfone); PES (Polyetherosulfone); PEI (Polyetherimide); PBT (Polybutyl terephalate); PPS (Polyphenylene sulfide); PEEK (Polyethereth erketone); PETG (Polyethylene terephthalate-glycol); or Keelf, or any other polymer and or metal. These walls need to be thick enough so as not to bow under the internal pressure of the system. The height and depth of the walls will depend on the total size of the structure. While the total volume of the system has a bearing on the amount of DIW that is ozonated at a given period of time, the actual volume of the system does not matter for the invention to work properly. The volume can be determined based on the amount of ozonated DIW needed. The specific dimensions of one system built by the instant inventor to test the system are given in FIGS. 1a–1c.

Liquid (preferably DIW) is input into diffuser 100 by means of input port 118. The substance or gas to be diffused into the liquid (preferably ozone) is input into the diffuser by input port 116. The ozone is passed through chamber 106 which is either comprised of the same material as the internal and external walls (with holes in it so that the ozone can bubble out) or a membrane-type material which allows the ozone to pass out of passage 106 but does not allow any appreciable amount of liquid contained in the instant invention (DIW) to pass into passage 106. In either case, it is preferably that the pressure of the ozone is greater than the pressure of the ambient liquid such that the flow will be from chamber 106 to open areas 109.

Figure 1D:
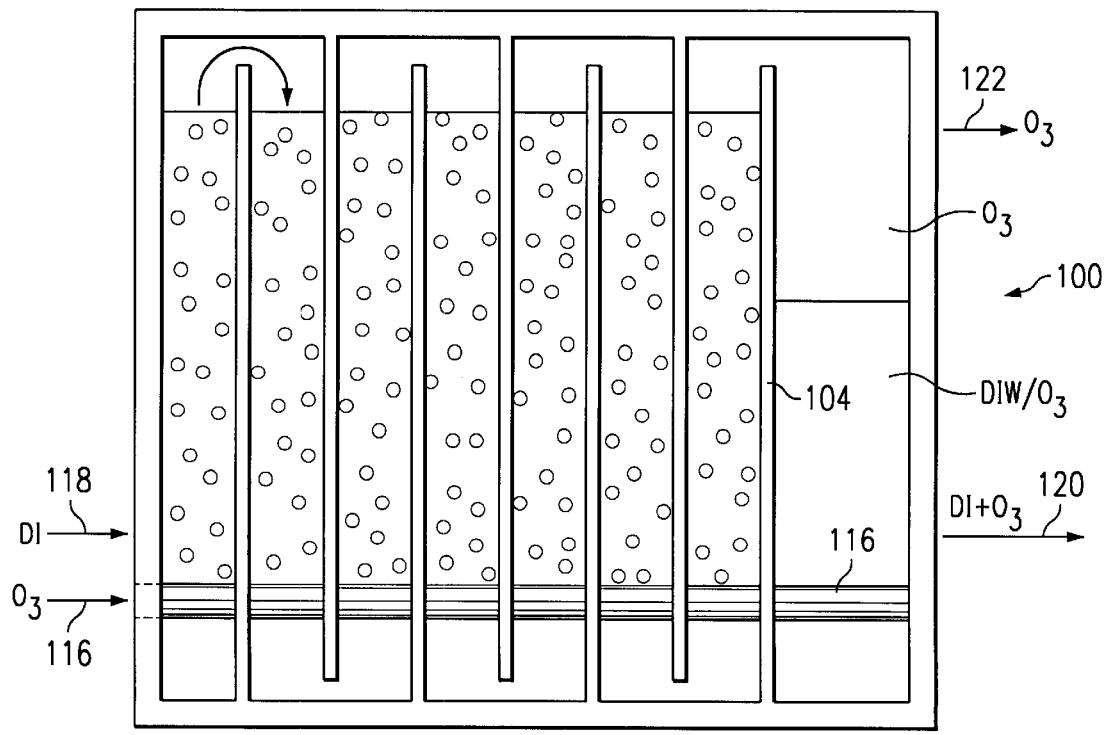
FIG. 1d is a cross-sectional front view of the ozone diffuser of one embodiment of the instant invention.

As is more clearly illustrated in FIG. 1d, DIW (also referred to as "DI") is flowed into diffuser 100 by means of port 118. The DIW flows up the first chamber with bubbles of gas (preferably ozone). As the level of DIW rises in the first chamber, it spills over the first interior wall and into the second chamber. In the second chamber the DIW flows downwardly in contrary to the direction of the flow of ozone bubbles. As the DIW passes through these chambers 109 (up and down), the DIW becomes more and more diffused with ozone. Hence, the diffuser may be comprised of any number of chambers. However, the more chambers, the more diffusion of ozone into the DIW (to saturation point). The ozonated DIW is passed out of diffuser 100 via port 120.

The ozone bubbled into the system 100 will collect at the top of the system. This is shown as the white are in FIG. 1d. This ozone may be bled off by vent 122, thereby controlling the gas flow (with a controller, bleeder or regulator valve).

FIG. 3 is a graph illustrating the amount of ozone diffused into DIW using the prior art method (graph 302), the diffuser of the instant invention after one pass through diffuser 100 (graph 304), and the diffuser of the instant invention after the ozonated DIW is recirculated through diffuser 100 (graph 306). Using the prior art method of bubbling ozone in stagnant DIW or recirculated DIW from the bottom of the tank, the amount of ozone diffused in the DIW reaches concentration of ozone at around 2 to 4 ppm. However, using the diffuser of the instant invention, the amount of ozone diffused in the DIW increases the amount of gas (preferably ozone) diffused with time in the diffuser.

Although specific embodiments of the present invention are herein described, they are not to be construed as limiting the scope of the invention. Many embodiments of the present invention will become apparent to those skilled in the art in light of methodology of the specification. The scope of the invention is limited only by the claims appended.

What is claimed is:

1. An apparatus for diffusing a gas into a liquid, said apparatus comprising:
   an outer structure, having a top and a bottom;
   a pipe extending into the outer structure, the pipe having a gas input port to receive the gas, and having a plurality of openings along its length through which the gas may be introduced into the outer structure;
   a liquid input port extending into the outer structure at a location below the pipe, for introducing the liquid into the walled container; and
   at least a first interior wall connected to the bottom of the outer structure, for defining a first region, within which openings in the pipe are disposed so that the gas and the liquid flow in substantially the same direction, the first interior wall having an opening near the top of the outer structure over which the liquid can flow from the first region into a second region, within which openings in the pipe are disposed so that the gas and the liquid flow in substantially opposite directions.

2. The apparatus of claim 1, wherein the gas comprises ozone and the liquid comprises water.

3. The apparatus of claim 2, wherein said water is deionized water.

4. The apparatus of claim 1, wherein said outer structure is comprised of a material selected from the group consisting of: PP, PTFE, PFA, ECTFE, PVDF, PE, PMMA, ABS, PC, PSO, PES, PEI, PBT, PPS, PEEK, PETG, Keelf, and quartz.

5. The apparatus of claim 1, wherein the gas is comprised of a substance selected from the group consisting of: ozone, ammonia, and HCl.

6. The apparatus of claim 1, wherein the liquid is comprised of a substance selected from the group consisting of: DIW, ammonia, HCl, HF, peroxide, and sulfuric acid.

7. An apparatus for diffusing a first substance into a second substance, said apparatus comprising:
   a top outer wall;
   a bottom outer wall;
   a front outer wall;
   a back outer wall;
   a first side outer wall;
   a second side outer wall, said outer walls defining an inner space therein;
   a first inner wall extending from an inner surface of said bottom outer wall almost to an inner surface of said top outer wall within said inner space, a first space is present between said first inner wall and said inner surface of said top outer wall;
   a second inner wall extending from said inner surface of said top outer wall almost to said inner surface of said bottom wall within said inner space, a second space is present between said second inner wall and said inner surface of said bottom wall;
   a passage extending from first side wall substantially to said second side wall in said inner space, said first substance introduced into said passage so as to introduce said first substance into said second substance in said inner space;
   a first chamber formed within said inner space and defined by said first inner wall and said first side outer wall;
   a second chamber formed within said inner space and defined by said second inner wall and said second outer wall;
   and wherein in either said first chamber or said second chamber said first substance and said second substance flow in same direction and said first substance and said second substance flow in the opposite direction in the other of said first or second chambers.

8. The apparatus of claim 7, wherein said first substance is ozone and said second substance is water.

9. The apparatus of claim 8, wherein said water is deionized water.

10. The apparatus of claim 7, wherein said first inner wall, said second inner wall, said top outer wall, said bottom outer wall, said front outer wall, said back outer wall, said first side outer wall, and said second side outer wall are comprised of the same material.

11. The apparatus of claim 10, wherein said same material is comprised of a material selected from the group consisting of: PP, PTFE, PFA, ECTFE, PVDF, PE, PMMA, ABS, PC, PSO, PES, PEI, PBT, PPS, PEEK, PETG, Keelf, and quartz.

12. The apparatus of claim 7, wherein said first substance is comprised of a substance selected from the group consisting of: ozone, ammonia, and HCl.

13. The apparatus of claim 7, wherein said second substance is comprised of a substance selected from the group consisting of: DIW, ammonia, HCl, HF, peroxide, and sulfuric acid.

* * * * *